United States Patent
Kurosawa et al.

(10) Patent No.: US 9,404,470 B2
(45) Date of Patent: Aug. 2, 2016

(54) HYDRAULIC MACHINE AND METHOD OF OPERATING SAME

(71) Applicant: KABUSHIKI KAISHA TOSHIBA, Minato-ku (JP)

(72) Inventors: Sadao Kurosawa, Yokohama (JP); Toshifumi Kurokawa, Kamakura (JP); Takashi Fujita, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 415 days.

(21) Appl. No.: 14/010,665

(22) Filed: Aug. 27, 2013

(65) Prior Publication Data
US 2014/0079532 A1    Mar. 20, 2014

(30) Foreign Application Priority Data
Sep. 19, 2012    (JP) ................. 2012-205754

(51) Int. Cl.
| | |
|---|---|
| F04D 27/02 | (2006.01) |
| F03B 3/02 | (2006.01) |
| F03B 11/04 | (2006.01) |
| F03B 3/12 | (2006.01) |

(52) U.S. Cl.
CPC . *F03B 3/02* (2013.01); *F03B 3/125* (2013.01); *F03B 11/04* (2013.01); *Y02E 10/223* (2013.01); *Y02E 10/226* (2013.01)

(58) Field of Classification Search
USPC ......... 415/1, 13, 17, 24, 32–36, 42, 115–118, 415/158–163, 203; 416/168 A, 174, 239, 416/244, 244 R, 244 A, 244 B, 245 A
See application file for complete search history.

(56) References Cited

U.S. PATENT DOCUMENTS

| | | | | |
|---|---|---|---|---|
| 1,516,095 | A * | 11/1924 | Haeberlein | ............. F03B 15/10 415/123 |
| 2,972,469 | A * | 2/1961 | Mayo, Jr. | ............. F03B 11/066 415/163 |

(Continued)

FOREIGN PATENT DOCUMENTS

| | | |
|---|---|---|
| CN | 1714237 A | 12/2005 |
| JP | 54-25947 U | 2/1979 |

(Continued)

OTHER PUBLICATIONS

Office Action issued Sep. 4, 2013 in New Zealand patent Application No. 614726.

(Continued)

*Primary Examiner* — Binh Q Tran
(74) *Attorney, Agent, or Firm* — Oblon, McClelland, Maier & Neustadt, L.L.P.

(57) ABSTRACT

In one embodiment, a hydraulic machine includes a runner including a plurality of blades arranged in a ring shape, a crown connected to the blades from an upper side and having a lower end surface at a position surrounded by the blades, and a band connected to the blades from a lower side, the runner being configured to convert energy of pressured water into rotational energy. The machine further includes a main shaft configured to transmit the rotational energy of the runner to a generator, and a draft pipe located downstream of the runner, and configured so that the water used to drive the runner flows into the draft pipe. The machine further includes a columnar member disposed on a rotation axis of the main shaft below the crown, and having a diameter smaller than a diameter of the lower end surface of the crown.

9 Claims, 10 Drawing Sheets

(56) References Cited

U.S. PATENT DOCUMENTS

| | | | | |
|---|---|---|---|---|
| 4,472,105 | A * | 9/1984 | Takiguchi | F03B 15/005 251/31 |
| 5,954,474 | A * | 9/1999 | Fisher, Jr. | F03B 3/06 29/889.2 |
| 6,926,494 | B2 * | 8/2005 | Sabourin | F03B 3/04 29/889.1 |
| 6,971,843 | B2 * | 12/2005 | Desy | F03B 3/02 261/37 |
| 7,318,702 | B2 * | 1/2008 | Budi | F03B 17/065 715/4.2 |
| 2007/0009352 | A1 | 1/2007 | Faile et al. | |
| 2011/0020124 | A1 | 1/2011 | Beral et al. | |
| 2011/0188991 | A1 | 8/2011 | Ciocan et al. | |

FOREIGN PATENT DOCUMENTS

| | | |
|---|---|---|
| JP | 58-13171 A | 1/1983 |
| JP | 2-125971 A | 5/1990 |
| JP | 2592508 B2 | 3/1997 |
| JP | 2598120 B2 | 4/1997 |
| JP | 10-196509 A | 7/1998 |
| JP | 2001-165024 | 6/2001 |
| JP | 2006-29227 A | 2/2006 |
| JP | 2006-29260 A | 2/2006 |

OTHER PUBLICATIONS

Combined Office Action and Search Report issued Jul. 3, 2015 in Chinese Patent Application No. 201310386729.2 (with English language translation).

Office Action issued Sep. 8, 2015 in Australian Patent Application No. 2013221948.

Office Action issued Sep. 25, 2015 in Japanese Patent Application No. 2012-205754 (with English language translation).

Australian Office Action issued Dec. 18, 2015 in Patent Application No. 2013221948.

* cited by examiner

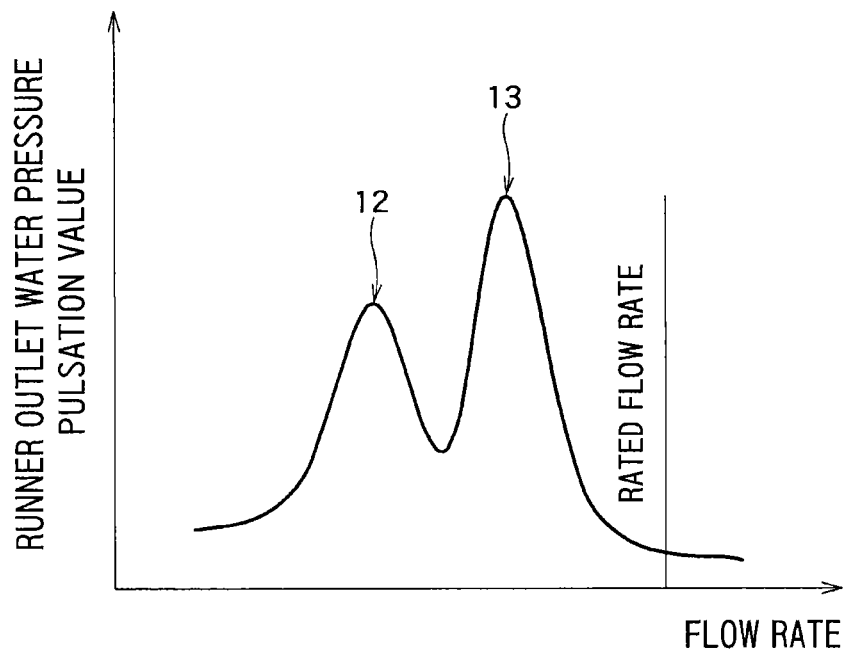
FIG. 8
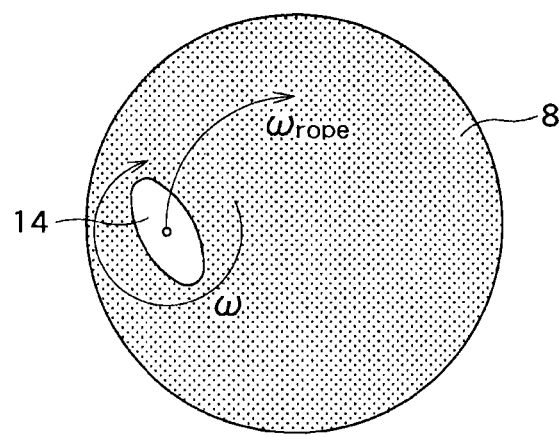 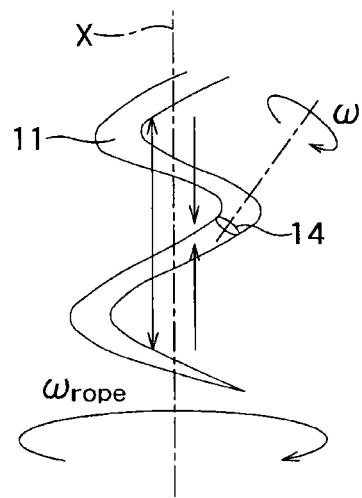
FIG. 9A  FIG. 9B

HYDRAULIC MACHINE AND METHOD OF OPERATING SAME

CROSS REFERENCE TO RELATED APPLICATION

This application is based upon and claims the benefit of priority from the prior Japanese Patent Application No. 2012-205754, filed on Sep. 19, 2012, the entire contents of which are incorporated herein by reference.

FIELD

Embodiments described herein relate to a hydraulic machine and a method of operating the same.

BACKGROUND

FIG. 7 is a cross-sectional view illustrating a structure of a conventional hydraulic machine. The hydraulic machine of FIG. 7 is a Francis turbine.

In the hydraulic machine of FIG. 7, a part of a flow path is formed by a casing 1 configured to guide pressured water from the upstream, a stay vane 2 disposed on an inner peripheral side of the casing 1 to rectify the water from the casing 1, and a stay ring 3 configured to interpose the stay vane 2 from above and below. Furthermore, the hydraulic machine of FIG. 7 is configured to guide the water flowing through the flow path to a guide vane 4 which is disposed on the inner peripheral side of the stay ring 3 and serves as a movable vane for flow rate adjustment, and to a runner 5 configured to convert energy of the pressured water into rotational energy.

The runner 5 has a plurality of blades 5a arranged in a ring shape, a crown 5b connected to the blades 5a from the upper side, having a ring shape, and connected to a main shaft 9, a band 5c connected to the blades 5a from the lower side and having a ring shape, and a runner cone 5d provided at a lower end of the crown 5b. The runner 5 is housed between an upper cover 6 and a lower cover 7. The water used to drive the runner 5 is discharged to a draft pipe 8 located downstream of the runner 5, and is discharged to a drainage path via the draft pipe 8. Furthermore, the main shaft 9 is connected to a rotor shaft of a generator 10, and supplies the generator 10 with a driving force for power generation by transmitting the rotational energy of the runner 5 to the generator 10.

Generally, the blades 5a of the runner 5 are fixed. When the output of the hydraulic machine is changed, the flow rate is adjusted by varying the degree of opening of the movable guide vane 4. For that reason, even if an inflow angle of the water flow to the runner 5 changes due to a reduction in the water level or the like of a dam, a situation in which all of the energy of the water flow in the runner 5 cannot be converted occurs since it is not possible to make the blades 5a of the runner 5 movable. As a result, swirl flow flows out of the outlet side of the runner 5. In particular, this phenomenon appears prominently at the time of partial load operation of a small flow rate, and a large spiral vortex 11 due to the swirling flow is generated within the draft pipe 8 in the vicinity of the outlet of the runner 5. Pressure drops significantly in the central portion of the vortex 11, and a cavity filled with water vapor and free air is generated. The bubbled vortex 11 whirls within the draft pipe 8, and therefore, the water pressure pulsation occurs.

The relation between the water pressure pulsation and the flow rate is illustrated in FIG. 8. FIG. 8 is a graph illustrating water pressure pulsation characteristics of the conventional hydraulic machine. From FIG. 8, it can be seen that two regions 12 and 13 having the increased water pressure pulsation exist in a region less than the rated flow rate. Accordingly, the flow rate becomes smaller than the rated flow rate due to a decrease in the water level of the dam or the like, and a large water pressure pulsation occurs when becoming a flow rate in the regions 12 and 13.

It has been reported that the magnitude of the water pressure pulsation of the region 12 is dependent on the strength of the vortex 11, and becomes maximum around a flow rate of about half of the rated flow rate due to the nature of the swirling flow that is a factor of the vortex 11.

In contrast, in the previous visualization studies, it has been known that, as illustrated in FIGS. 9A and 9B, the water pressure pulsation of the region 13 is a synthesis of a rotation mode in which a cross-sectional shape of the vortex 11 is an ellipse 14 and rotates with respect to the spiral axis, and an expansion/contraction mode in which the whole generation regions of the vortex 11 expand and contract in the vertical direction. FIGS. 9A and 9B are a top view and a cross-sectional view for describing the rotation mode and the expansion/contraction mode.

Furthermore, regarding the spiral vortex 11 having the elliptical cross-section that causes the water pressure pulsation of the region 13, it is estimated that the spiral vortex 11 having the elliptical cross-section is formed in the form illustrated in FIGS. 10A and 10B based on a phenomenon analysis using the recent flow analysis. FIGS. 10A and 10B are a cross-sectional view and a side view for describing a generation mechanism of the spiral vortex 11 having the elliptical cross-section. FIG. 10B is a side view of a region 15 of FIG. 10A, and illustrates a cylindrical wall surface of the runner cone 5d.

As illustrated in FIG. 10B, in the flow field in the vicinity of the wall surface of the runner cone 5d, a centrifugal force 16 caused by the inclination of the wall surface of the runner cone 5d and a dynamic pressure 17 in a main flow direction are major fluid forces. Both of the fluid forces are balanced in the above-mentioned region 13, and a local recirculation region 18 is formed. Since the recirculation region 18 is formed in the vicinity of the wall surface the runner cone 5d in a state of being pressed by the main flow, the recirculation region 18 is formed in an elliptical shape. The recirculation region 18 flows down to a lower zone of the runner 5, and therefore, the spiral vortex 11 having the elliptical cross-section is formed.

Furthermore, regarding the expansion/contraction mode in which the whole generation regions of the vortex 11 expand and contract in the vertical direction, as illustrated in FIG. 11, it is believed that the expansion/contraction mode is caused by the balance between a force 19 by which the vortex 11 attempts to expand to the downstream side by the dynamic pressure of the outlet flow of the runner 5, and a force 20 attempting to return the vortex 11 to the upstream side by the pressure recovery effect of the draft pipe 8. FIG. 11 is a cross-sectional view for describing a generation mechanism of the expansion/contraction mode.

BRIEF DESCRIPTION OF THE DRAWINGS

FIG. 8 is a graph illustrating water pressure pulsation characteristics of the conventional hydraulic machine;

FIGS. 9A and 9B are a top view and a cross-sectional view for describing a rotation mode and an expansion/contraction mode;

DETAILED DESCRIPTION

Figure 1:
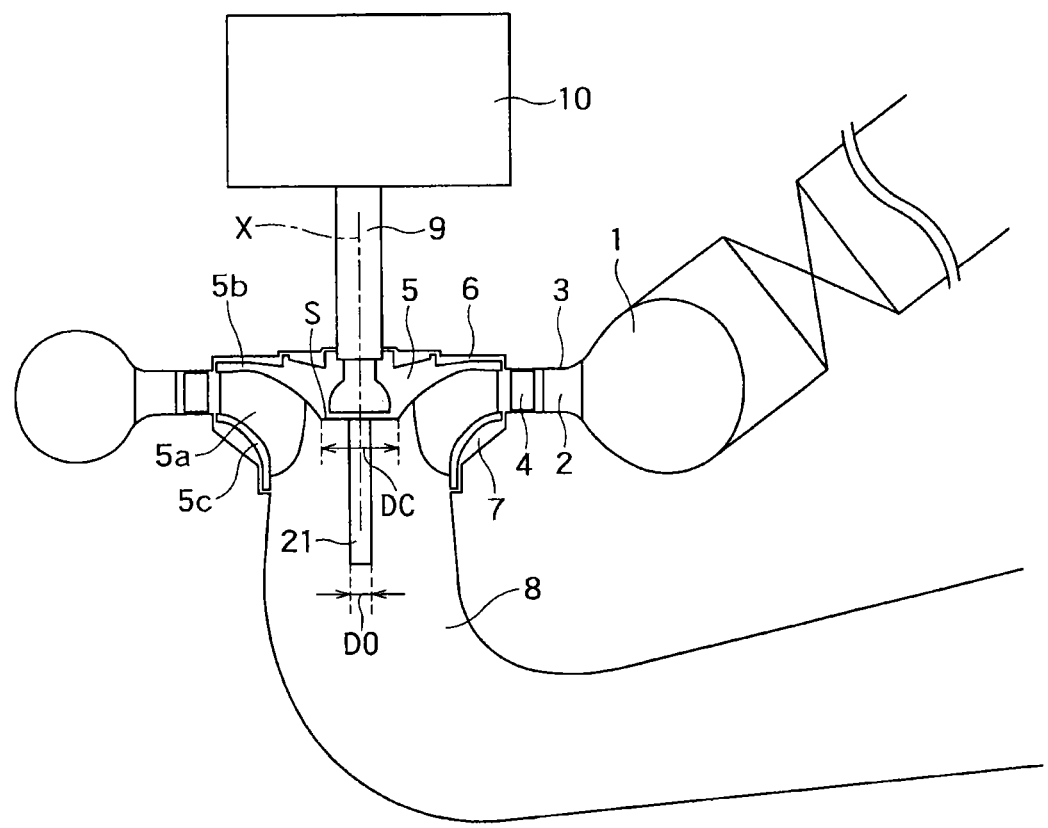
FIG. 1 is a cross-sectional view illustrating a structure of a hydraulic machine of a first embodiment.

Embodiments will now be explained with reference to the accompanying drawings.

As a method of suppressing the water pressure pulsation of the region 12, a method of attaching projecting fins to the inner wall of the draft pipe 8 in order to suppress the swirling flow, and a method of supplying air into the draft pipe 8 in order to stabilize the vortex 11 have been proposed. As examples of the method of supplying the air, there are a method of forcibly supplying the air from the upper cover 6, a method of supplying the air from an air supply pipe penetrating through the inner wall of the draft pipe 8, a method of supplying the air to the lower side of the runner 5 from the inside of the main shaft 9 by forming the inside of the main shaft 9 as a cavity, and the like. Meanwhile, some water pressure pulsations of the region 13 have been discovered by the recent visualization studies, and a method of effectively suppressing the water pressure pulsation has not been proposed.

According to an embodiment, a hydraulic machine includes a runner that converts energy of pressured water into rotational energy, and the runner includes a plurality of blades arranged in a ring shape, a crown that is connected to the blades from the upper side and has a lower end surface at a position surrounded by the blades, and a band connected to the blades from the lower side. Furthermore, the machine includes a main shaft configured to transmit the rotational energy of the runner to a generator, and a draft pipe which is located downstream of the runner and into which the water used to drive the runner flows. Furthermore, the machine includes a columnar member that is arranged on a rotation axis of the main shaft below the crown, and has a diameter smaller than that of the lower end surface of the crown.

In one embodiment, a hydraulic machine includes a runner including a plurality of blades arranged in a ring shape, a crown connected to the blades from an upper side and having a lower end surface at a position surrounded by the blades, and a band connected to the blades from a lower side, the runner being configured to convert energy of pressured water into rotational energy. The machine further includes a main shaft configured to transmit the rotational energy of the runner to a generator, and a draft pipe located downstream of the runner, and configured so that the water used to drive the runner flows into the draft pipe. The machine further includes a columnar member disposed on a rotation axis of the main shaft below the crown, and having a diameter smaller than a diameter of the lower end surface of the crown.

First Embodiment

FIG. 1 is a cross-sectional view illustrating a structure of a hydraulic machine of a first embodiment. The hydraulic machine of FIG. 1 is a Francis turbine.

Figure 7:
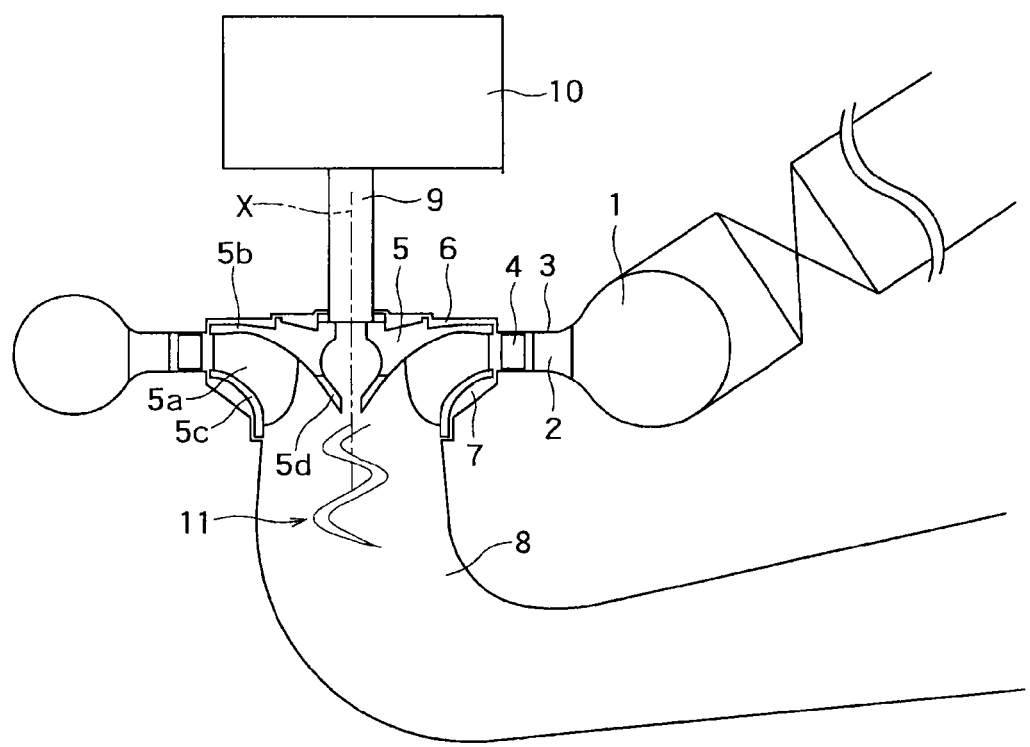
FIG. 7 is a cross-sectional view illustrating a structure of a conventional hydraulic machine.
Figure 10A:
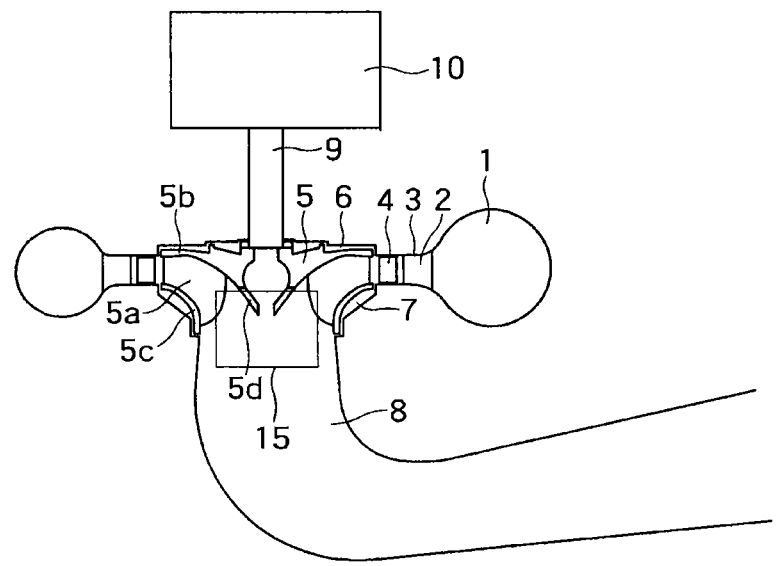
FIGS. 10A and 10B are a cross-sectional view and a side view for describing a generation mechanism of a spiral vortex having an elliptical cross-section.
Figure 10B:
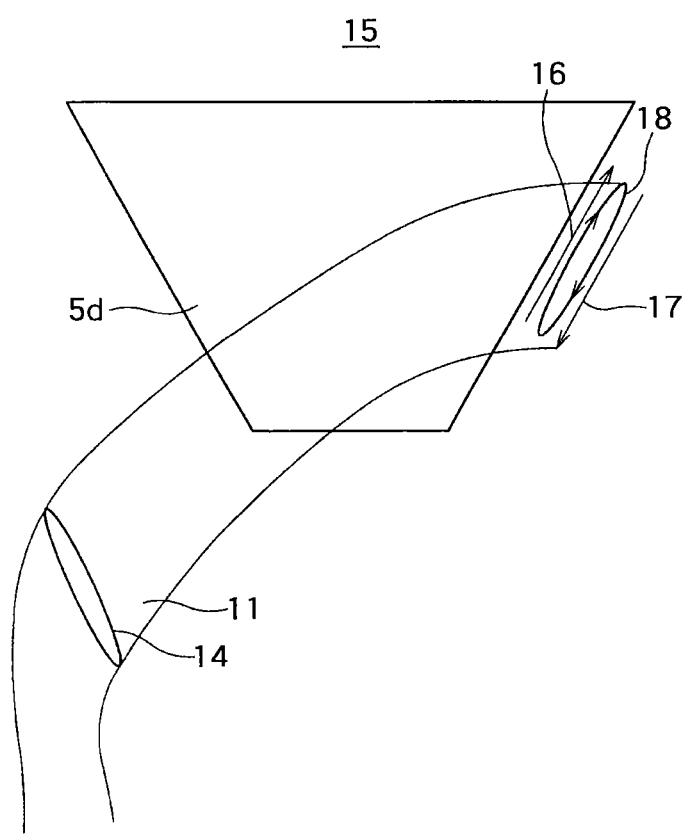
Figure 11:
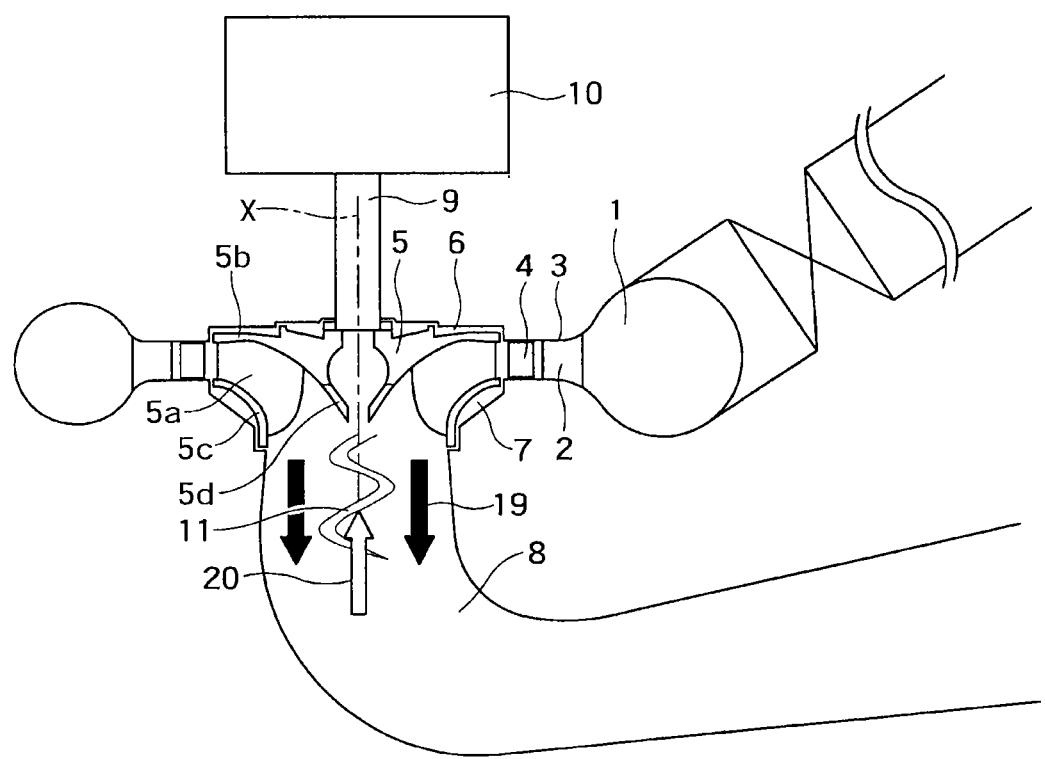
FIG. 11 is a cross-sectional view for describing a generation mechanism of the expansion/contraction mode.

Similarly to the hydraulic machine of FIG. 7, the hydraulic machine of FIG. 1 includes a casing 1, a stay vane 2, a stay ring 3, a guide vane 4, a runner 5, an upper cover 6, a lower cover 7, a draft pipe 8, a main shaft 9 and a generator 10.

The runner 5 of the present embodiment is provided with a plurality of blades $5a$, a crown $5b$, and a band $5c$ but is not provided with a runner cone $5d$. As a result, the crown $5b$ of the present embodiment has a lower end surface S at a position surrounded by the blades $5a$, and the lower end surface S is exposed to the downstream side of the runner 5.

The crown $5b$ of the present embodiment has a cavity on top of the lower end surface S. The crown $5b$ may not have such a cavity. However, providing such a cavity in the crown $5b$ has an advantage that it is possible to reduce the weight of the crown $5b$ so as to easily rotate the runner 5.

In addition, the lower end surface S of the crown $5b$ is a solid flat surface in the present embodiment, but the lower end surface S may be a hollow flat surface as will be described below. Therefore, the cavity does not penetrate the crown $5b$ in the present embodiment, but may penetrate the crown $5b$.

Furthermore, the hydraulic machine of FIG. 1 is provided with a cylindrical columnar member 21. The columnar member 21 is arranged on a rotation axis X of the main shaft 9 below the crown $5b$, and has a diameter D0 smaller than a diameter DC of the lower end surface S of the crown $5b$. The columnar member 21 is attached to the lower end surface S of the crown $5b$. Therefore, the columnar member 21 rotates together with the rotation of the runner 5 and the main shaft 9.

As long as the columnar member 21 has a shape in which of specifying the diameter D0 can be specified, the columnar member 21 may have any shape other than a cylindrical shape. For example, the columnar member 21 may have a shape in which a protrusion, a recess, a trench, a through hole or the like is provided in a cylindrical member. However, since the columnar member 21 of the present embodiment rotates with the runner 5 and the main shaft 9, it is desirable that the columnar member 21 do not have a protrusion and/or a recess that may disturb the water flow. In addition, in embodiments described below, a columnar member of a circular pipe type will be described.

Effects of the first embodiment will be described.

As described above, the columnar member 21 in the present embodiment is arranged on the rotation axis X of the main shaft 9 below the crown $5b$. A location where the columnar member 21 is arranged overlaps with a generation region of the vortex 11. Furthermore, the extension direction of the columnar member 21 is a vertical direction similarly to the expansion/contraction mode in which the whole generation regions of the vortex 11 expand and contract. Accordingly, the columnar member 21 acts as a resistance of the expansion/contraction mode of the vortex 11. Therefore, according to the present embodiment, it is possible to suppress the water pressure pulsation caused by the expansion/contraction mode of the vortex 11.

Furthermore, since the runner cone $5d$ is not provided in the present embodiment, the elliptical recirculation region 18 that is a main factor of causing a cross-sectional shape of the vortex 11 to be the ellipse 14 is not generated, and therefore, an occurrence of rotation mode in which the vortex 11 rotates with respect to the spiral axis is suppressed. Furthermore, since the columnar member 21 provided in place of the runner cone 5d has the diameter D0 smaller than the diameter DC of the lower end surface S of the crown 5b, the columnar member 21 is less likely to be a factor of generating the elliptical recirculation region 18. Therefore, according to the present embodiment, it is possible to suppress the water pressure pulsation due to the rotation mode of the vortex 11.

In this way, according to the present embodiment, it is possible to suppress the water pressure pulsation due to the rotation mode or the expansion/contraction mode of the vortex 11.

Figure 2A:
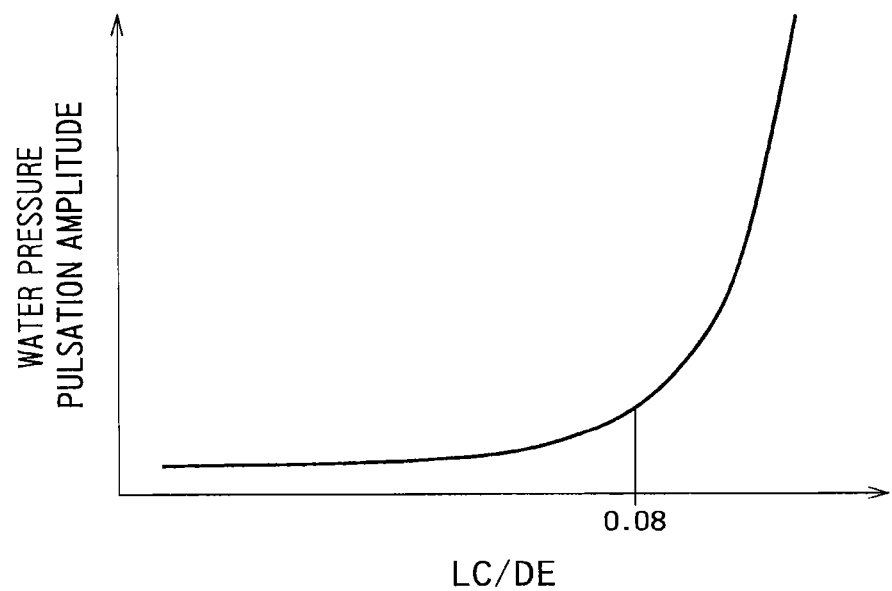
FIGS. 2A and 2B are a graph illustrating a relation between a value of LC/DE and a water pressure pulsation amplitude in the first embodiment, and a cross-sectional view for describing LC and DE.
Figure 2B:
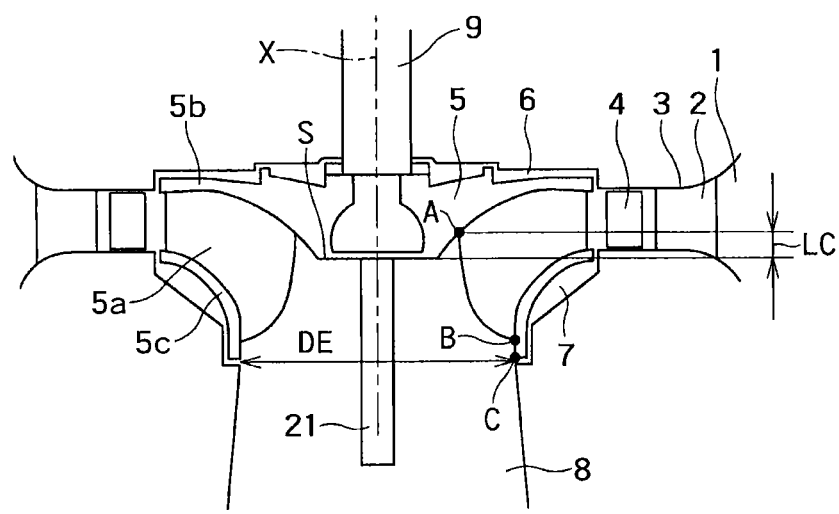

FIGS. 2A and 2B are a graph illustrating a relation between a value of LC/DE and a water pressure pulsation amplitude in the first embodiment, and a cross-sectional view for describing LC and DE.

FIG. 2B is a cross-sectional view illustrating the structure of the hydraulic machine of the first embodiment similarly to FIG. 1. Reference numeral A represents an inner end of a connecting portion between the blades 5a and the crown 5b. Reference numeral B represents an inner end of a connecting portion between the blades 5a and the band 5c. Reference numeral C represents an outlet end of the band 5c. Furthermore, reference numeral LC represents an axial distance between the inner end A of the connecting portion between the blades 5a and the crown 5b and the lower end surface S of the crown 5b. Moreover, reference numeral DE represents an outlet diameter of the runner 5 (a diameter of the runner 5 in the outlet end C of the band 5c).

In the present embodiment, in order to effectively exert an effect of suppressing the water pressure pulsation, it is desirable that the axial distance LC be set to an appropriate value. The reason is that when the axial distance LC is too long, the elliptical recirculation region 18 generated in the vicinity of the side wall of the runner cone 5d may be similarly generated in the vicinity of the side wall of the crown 5b. Therefore, it is desirable that the axial distance LC be set to a short value.

Therefore, a relation between LC/DE (a ratio of LC to DE) obtained by non-dimensionalizing the axial distance LC by the runner outlet diameter DE and the water pressure pulsation amplitude was measured by a model test. FIG. 2A illustrates the measurement result. As illustrated in FIG. 2A, when LC/DE is approximately greater than 0.08, the value of the water pressure pulsation amplitude increases rapidly. Therefore, it is desirable that the value of LC/DE be set to be less than 0.08 (LC/DE<0.08).

As described above, the columnar member 21 having the diameter D0 smaller than the diameter DC of the lower end surface S of the crown 5b is arranged on the rotation axis X of the main shaft 9 below the crown 5b in the present embodiment. Therefore, according to the present embodiment, it is possible to suppress the water pressure pulsation due to the rotation mode or the expansion/contraction mode of the vortex 11.

Second Embodiment

Figure 3:
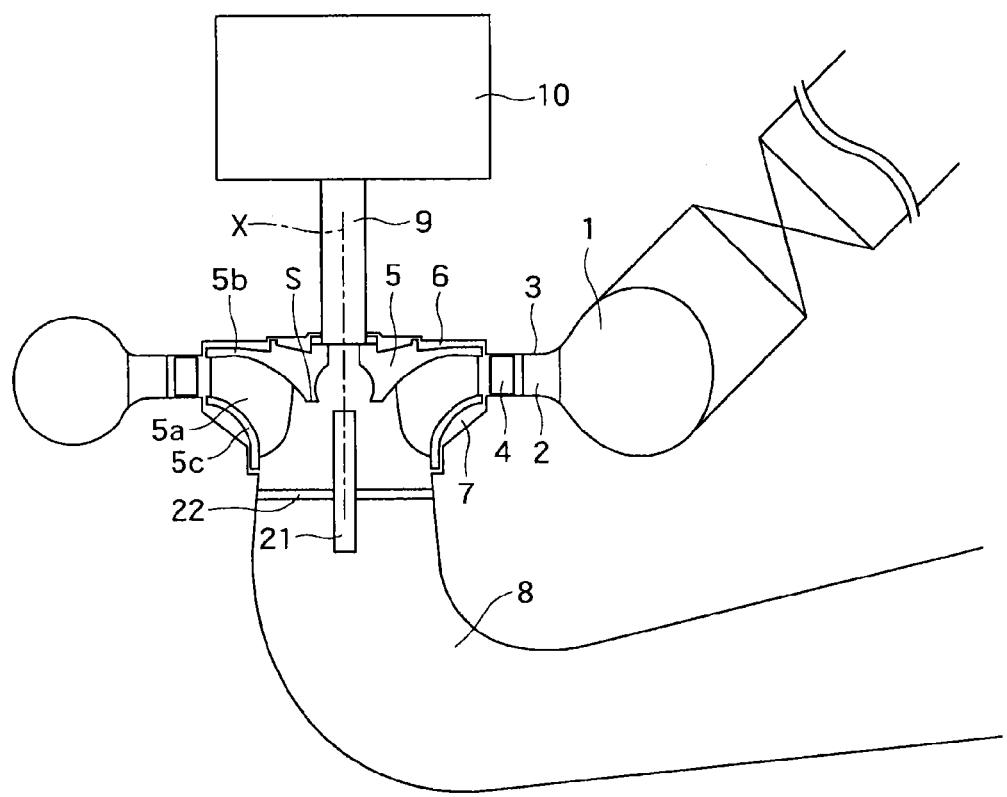
FIG. 3 is a cross-sectional view illustrating a structure of a hydraulic machine of a second embodiment.

FIG. 3 is a cross-sectional view illustrating a structure of a hydraulic machine of a second embodiment.

In the present embodiment, the lower end surface S of the crown 5b has a hollow flat surface, and has a ring shape. Furthermore, the columnar member 21 in the present embodiment is attached to the wall surface of the draft pipe 8 via struts 22. Specifically, the columnar member 21 is attached to the wall surface of a portion of the draft pipe 8 on the upstream side of the curved part (i.e., attached to an upper draft pipe). Therefore, the columnar member 21 of the present embodiment does not rotate with the runner 5 and the main shaft 9, and remains stationary.

In addition, although the number of struts 22 is two in the present embodiment, it may be any number as long as it is possible to support the columnar member 21. Furthermore, although the lower end surface S of the crown 5b is the hollow flat surface, it may be a solid flat surface similarly to the first embodiment.

In the present embodiment, as in the first embodiment, the columnar member 21 having the diameter D0 smaller than the diameter DC of the lower end surface S of the crown 5b is arranged on the rotation axis X of the main shaft 9 below the crown 5b. Therefore, according to the present embodiment, it is possible to suppress the water pressure pulsation due to the rotation mode or the expansion/contraction mode of the vortex 11.

Since the columnar member 21 in the present embodiment is attached to the draft pipe 8 instead of the runner 5, there is an advantage that it is possible to reduce the weight applied to the runner 5 in the present embodiment. Meanwhile, since it is not necessary to install the struts 22 in the first embodiment, there is an advantage that it is possible to prevent a situation in which the struts 22 disturb the water flow in the first embodiment.

Third Embodiment

Figure 4:
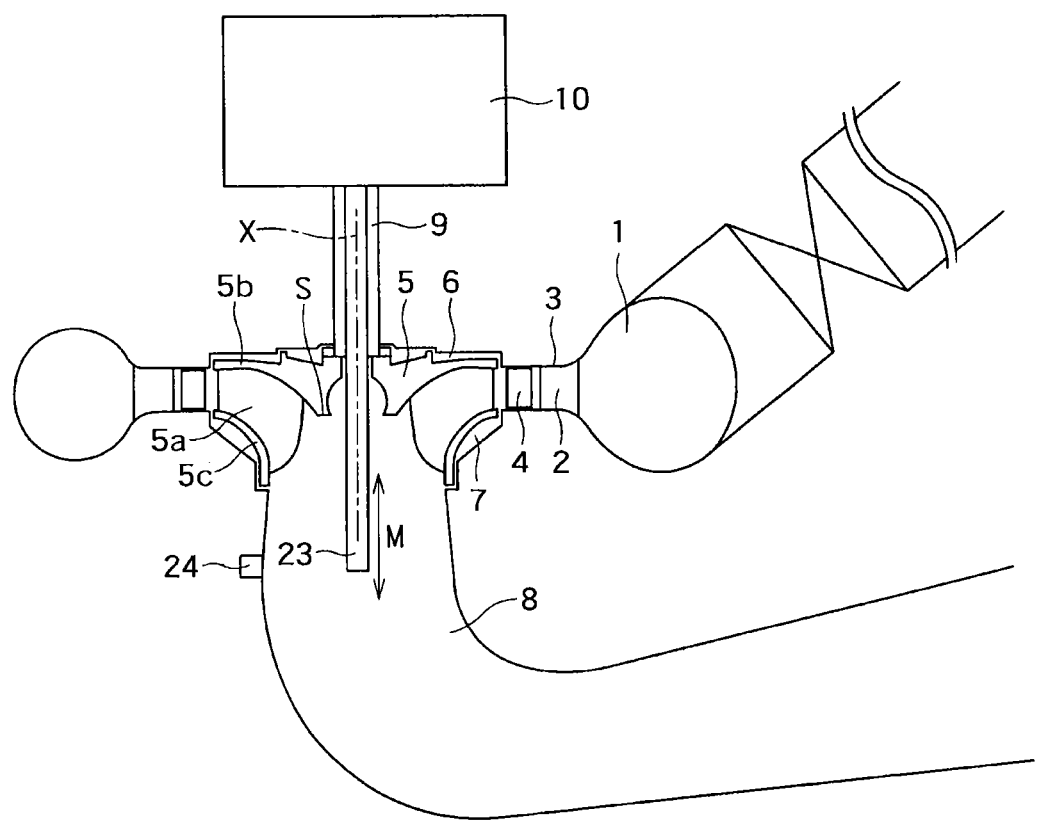
FIG. 4 is a cross-sectional view illustrating a structure of a hydraulic machine of a third embodiment.

FIG. 4 is a cross-sectional view illustrating a structure of a hydraulic machine of a third embodiment.

In the present embodiment, the lower end surface S of the crown 5b has a hollow flat surface, and has a ring shape. Furthermore, the hydraulic machine of the present embodiment includes an air supply pipe 23 which passes through the inside of the main shaft 9 and the crown 5b, and a pressure sensor 24 which detects the occurrence of unstable vibration in the downstream of the runner 5. As indicated by an arrow M, the air supply pipe 23 has a structure capable of expanding and contracting a leading end portion in the vertical direction. Furthermore, the pressure sensor 24 is attached to the outer wall surface of the draft pipe 8 (specifically, attached to the upper draft pipe).

In the present embodiment, the water pressure pulsation due to the rotation mode or the expansion/contraction mode of the vortex 11 is suppressed by the use of the air supply pipe 23. The air supply pipe 23 of the present embodiment corresponds to an example of the columnar member of the circular pipe type described above. As illustrated in FIG. 4, the air supply pipe 23 of the present embodiment has a diameter smaller than that of the lower end surface S of the crown 5b, and its leading end portion is arranged on the rotation axis X of the main shaft 9 below the crown 5b.

Although the air supply pipe 23 may be configured so that its leading end portion can expand and contract or cannot expand and contract, the air supply pipe 23 in the present embodiment is configured so that its leading end portion can expand and contract. The reason is that the length of the air supply pipe 23 desirable for the air supply is generally different from the length of the air supply pipe 23 desirable for suppression of the water pressure pulsation (more specifically, desirable for the suppression of the water pressure pulsation due to the expansion/contraction mode of the vortex 11).

Therefore, unstable vibration due to the water pressure pulsation is detected by the pressure sensor 24 in the present embodiment. Moreover, when the pressure sensor 24 detects an occurrence of unstable vibration, a control unit (not illustrated) of the hydraulic machine extends the leading end portion of the air supply pipe 23 downward from the lower end surface S of the crown 5b. Accordingly, it is possible to suppress the water pressure pulsation.

As described above, the air supply pipe 23 having the diameter D0 smaller than the diameter DC of the lower end surface S of the crown 5b is arranged on the rotation axis X of the main shaft 9 below the crown 5b in the present embodiment. Therefore, according to the present embodiment, it is possible to suppress the water pressure pulsation due to the rotation mode or the expansion/contraction mode of the vortex 11, similarly to the first and second embodiments.

In the present embodiment, the water pressure pulsation due to the rotation mode or the expansion/contraction mode of the vortex 11 may be suppressed by the use of a water supply pipe for feeding the water in place of the air supply pipe 23 for feeding the air.

Fourth Embodiment

Figure 5A:
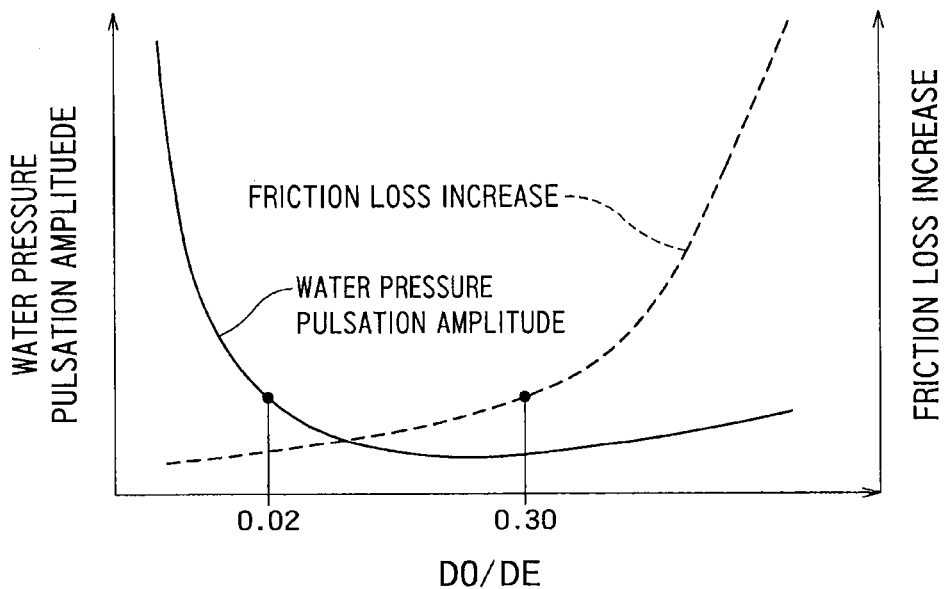
FIGS. 5A and 5B are a graph illustrating a relation among a value of D0/DE, the water pressure pulsation amplitude, and a friction loss increase in a fourth embodiment, and a diagram for describing D0 and DE.
Figure 5B:
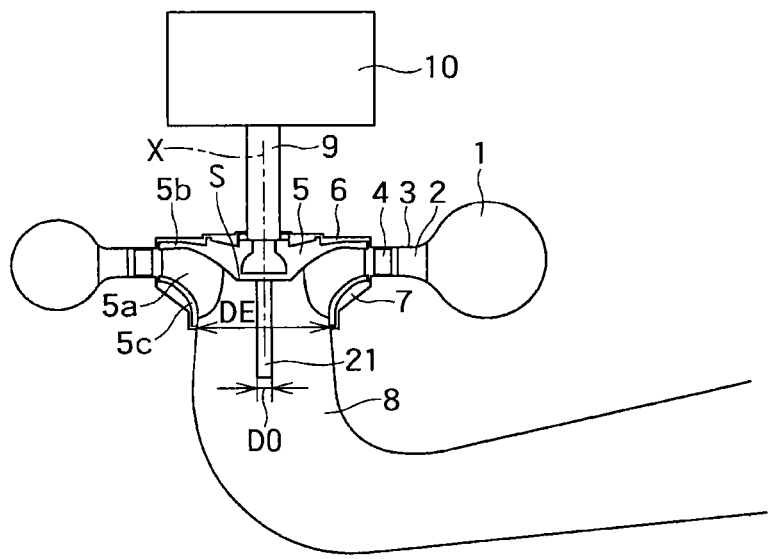

FIGS. 5A and 5B is a graph illustrating a relation among a value of D0/DE, the water pressure pulsation amplitude, and a friction loss increase in a fourth embodiment, and a diagram for describing D0 and DE.

FIG. 5B is a cross-sectional view illustrating a structure of a hydraulic machine of the fourth embodiment. The hydraulic machine of the fourth embodiment has the structure similar to that of the hydraulic machine of the first embodiment. Reference numeral D0 represents the diameter of the columnar member 21. Furthermore, reference numeral DE represents an outlet diameter of the runner 5.

In the present embodiment, in order to effectively exert an effect of suppressing the water pressure pulsation, it is desirable that the diameter D0 of the columnar member be set to an appropriate value. The reason is that when the diameter D0 of the columnar member is too small, the resistance effect of the columnar member 21 against the expansion/contraction mode of the vortex 11 is weak, and it is not possible to sufficiently suppress the water pressure pulsation. Furthermore, the reason is that when the diameter D0 of the columnar member is too large, the flow velocity increases by a reduction in a cross-sectional area of the flow path, and the friction loss is increased. Therefore, it is desirable that the diameter D0 of the columnar member be set to a value that is not too large and not too small.

Therefore, the relation among D0/DE (a value obtained by dividing D0 by DE) obtained by non-dimensionalizing the diameter D0 of the columnar member by the runner outlet diameter DE, the water pressure pulsation amplitude, and the friction loss increase was measured by the model test. FIG. 5A illustrates the measurement results. As illustrated in FIG. 5A, when D0/DE is approximately less than 0.02, the value of the water pressure pulsation amplitude is increased rapidly. Meanwhile, when D0/DE is approximately greater than 0.30, the value of the friction loss increase is increased rapidly.

Therefore, the value of D0/DE in the present embodiment is set to be less than 0.02 and greater than 0.30 (0.02<D0/DE<0.30). Consequently, according to the present embodiment, it is possible to suppress the water pressure pulsation due to the rotation mode or the expansion/contraction mode of the vortex 11, while reducing the friction loss. The setting of the present embodiment may be applied to the second and third embodiments.

Fifth Embodiment

Figure 6A:
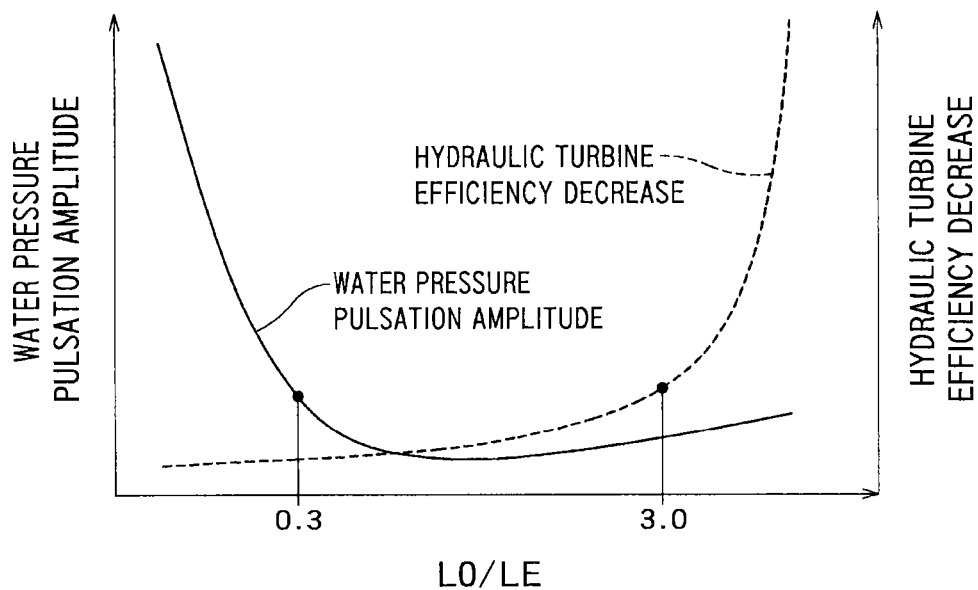
FIGS. 6A and 6B is a graph illustrating a relation among a value of L0/LE, the water pressure pulsation amplitude, and a hydraulic turbine efficiency decrease in a fifth embodiment, and a diagram for describing L0 and LE.
Figure 6B:
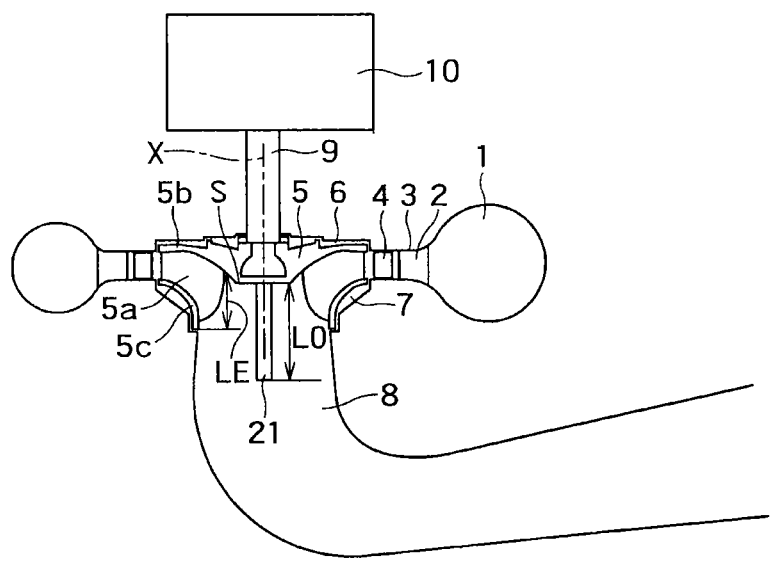

FIGS. 6A and 6B is a graph illustrating a relation among a value of L0/LE, the water pressure pulsation amplitude, and a hydraulic turbine efficiency decrease in a fifth embodiment, and a diagram for describing L0 and LE.

FIG. 6B is a cross-sectional view illustrating a structure of a hydraulic machine of the fifth embodiment. The hydraulic machine of the fifth embodiment has the structure similar to that of the hydraulic machine of the first embodiment. Reference numeral L0 represents a length of the columnar member 21. Reference numeral LE represents an axial distance between the inner end A of the connecting portion between the blades 5a and the crown 5b and the outlet end C of the band 5c. Positions of the inner end A and the outlet end C are referred in FIGS. 2A and 2B.

In the present embodiment, in order to effectively exert an effect of suppressing the water pressure pulsation, it is desirable that the length L0 of the columnar member be set to an appropriate value. The reason is that when the length L0 of the columnar member is too short, the resistance action of the columnar member 21 against the expansion/contraction mode of the vortex 11 is weak, and it is not possible to sufficiently suppress the water pressure pulsation. Further, the reason is that when the length L0 of the columnar member is too long, the friction loss generated in the side wall of the columnar member 21 and the hydraulic loss due to the curved flow of the draft pipe 8 increase, and the hydraulic turbine efficiency of the hydraulic machine is lowered. For that reason, it is desirable that the length L0 of the columnar member be set to a value that is not too short and not too long.

Accordingly, the relation among L0/LE (a value by dividing L0 by LE) obtained by non-dimensionalizing the length L0 of the columnar member by the axial distance LE, the water pressure pulsation amplitude, and the hydraulic turbine efficiency decrease was measured by the model test. FIG. 6A illustrates the measurement results. As illustrated in FIG. 6A, when L0/LE is approximately less than 0.3, the value of the water pressure pulsation amplitude is increased rapidly. Meanwhile, when L0/LE is approximately greater than 3.0, the value of the hydraulic turbine efficiency decrease is increased rapidly.

Therefore, the value of L0/LE in the present embodiment is set to be less than 0.3 and greater than 3.0 (0.3<L0/LE<3.0). Consequently, according to the present embodiment, it is possible to suppress the water pressure pulsation due to the rotation mode or the expansion/contraction mode of the vortex 11, while suppressing the decrease of the hydraulic turbine efficiency. The setting of the present embodiment may be applied to the second to fourth embodiments.

While certain embodiments have been described, these embodiments have been presented by way of example only, and are not intended to limit the scope of the inventions. Indeed, the novel machines and methods described herein may be embodied in a variety of other forms; furthermore, various omissions, substitutions and changes in the form of the machines and methods described herein may be made without departing from the spirit of the inventions. The accompanying claims and their equivalents are intended to cover such forms or modifications as would fall within the scope and spirit of the inventions.

The invention claimed is:

1. A hydraulic machine comprising:
a runner including a plurality of blades arranged in a ring shape, a crown connected to the blades from an upper side and having a lower end surface at a position surrounded by the blades, and a band connected to the blades from a lower side, the runner being configured to convert energy of pressured water into rotational energy;
a main shaft configured to transmit the rotational energy of the runner to a generator;

a draft pipe located downstream of the runner, and configured so that the water used to drive the runner flows into the draft pipe; and a columnar member disposed on a rotation axis of the main shaft below the crown, having a diameter smaller than a diameter of the lower end surface of the crown, disposed downstream of the runner, and disposed to contact the water used to drive the runner.

2. The machine of claim 1, wherein the columnar member is attached to the crown.

3. The machine of claim 1, wherein a ratio LC/DE of an axial distance LC between an inner end of a connecting portion between the blades and the crown and the lower end surface of the crown to an outlet diameter DE of the runner is less than 0.08.

4. The machine of claim 1, wherein the columnar member is attached to the draft pipe via a strut.

5. The machine of claim 1, wherein the columnar member is an air supply pipe or a water supply pipe passing through an inside of the main shaft and the crown.

6. The machine of claim 1, wherein a value D0/DE obtained by dividing the diameter D0 of the columnar member by an outlet diameter DE of the runner is greater than 0.02 and less than 0.30.

7. The machine of claim 1, wherein a value L0/LE obtained by dividing a length L0 of the columnar member by an axial distance LE between an inner end of a connecting portion between the blades and the crown and an outlet end of the band is greater than 0.3 and less than 3.0.

8. The machine of claim 1, wherein the lower end surface of the crown is a solid or hollow flat surface, and is exposed to a downstream side of the runner.

9. A method of operating a hydraulic machine, comprising:
converting energy of pressured water into rotational energy by a runner which includes a plurality of blades arranged in a ring shape, a crown connected to the blades from an upper side, having a lower end surface at a position surrounded by the blades, and connected to a main shaft, and a band connected to the blades from a lower side, a columnar member which has a diameter smaller than a diameter of the lower end surface of the crown being disposed on a rotation axis of the main shaft below the crown, disposed downstream of the runner, and disposed to contact the water used to drive the runner;

transmitting the rotational energy of the runner to a generator by the main shaft; and discharging the water used to drive the runner to a draft pipe located downstream of the runner.

* * * * *